United States Patent
Chakra et al.

(10) Patent No.: US 10,761,886 B2
(45) Date of Patent: Sep. 1, 2020

(54) DYNAMICALLY OPTIMIZING LOAD IN CLOUD COMPUTING PLATFORM USING REAL-TIME ANALYTICS

(71) Applicant: International Business Machines Corporation, Armonk, NY (US)

(72) Inventors: Al Chakra, Apex, NC (US); Yuk L. Chan, Rochester, NY (US); Liam S. Harpur, Dublin (IE); Philip Mullins, Skerries (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 79 days.

(21) Appl. No.: 16/120,799

(22) Filed: Sep. 4, 2018

(65) Prior Publication Data
US 2020/0073708 A1    Mar. 5, 2020

(51) Int. Cl.
G06F 9/46    (2006.01)
G06F 9/48    (2006.01)

(52) U.S. Cl.
CPC .................................. *G06F 9/4881* (2013.01)

(58) Field of Classification Search
None
See application file for complete search history.

(56) References Cited

U.S. PATENT DOCUMENTS 7,627,537 B2   12/2009  Lai
8,091,035 B2   1/2012   O'Sullivan et al.
9,116,754 B2   8/2015   Jung et al.
9,736,082 B2   8/2017   Rios et al.
2015/0095448 A1  4/2015  Hwang

OTHER PUBLICATIONS https://www.sas.com/en_us/insights/analytics/big-data-analytics.html#; "Big data analytics: What it is and why it matters"; Retrieved: Sep. 18, 2018; 5 pages.
Steven Jin; https://blogs.vmware.com/vcloud/2010/07/workload-optimization-is-it-a-musthave-for-cloud-computing.html; "Workload Optimization: Is It a Must-have for Cloud Computing?"; Dated: Jun. 22, 2010; Retrieved: Sep. 18, 2018; 8 pages.

(Continued)

*Primary Examiner* — Gregory A Kessler
(74) *Attorney, Agent, or Firm* — Cantor Colburn LLP; Teddi Maranzano

(57) ABSTRACT

According to one or more embodiments described herein, a computer-implemented method includes adding, by a first device, a first task request to a queue being processed by a data center. The first task request includes metadata indicative of a computing resource to be used by the data center for processing the first task request. The method further includes determining, by a second device, that the computing resource is also associated with a second task request of the second device. The method further includes aggregating, by the second device, the second task request with the first task request in the queue. The method further includes receiving, by the first device, a result in response to the first task request being executed by the data center. The method further includes receiving, by the second device, the result in response to the first task request being executed by the data center.

20 Claims, 11 Drawing Sheets

(56) References Cited

OTHER PUBLICATIONS

Abderrahim Ait Wakrime and Said Jabbour, "Formal Approach for QoS-Aware Cloud Service Composition," 2017 IEEE 26th International Conference on Enabling Technologies: Infrastructure for Collaborative Enterprises (WETICE), Year: 2017, pp. 30-35.

Jiajun Wang, Reena Panda and Lizy Kurian John, "Prefetching for cloud workloads: An analysis based on address patterns," 2017 IEEE International Symposium on Performance Analysis of Systems and Software (ISPASS), Year: 2017, pp. 163-172.

Nawras Alkassab, Chin-Tser Huang, Yu Chen, Baek-Young Choi and Sejun Song, "Benefits and schemes of prefetching from cloud to fog networks," 2017 IEEE 6th International Conference on Cloud Networking (CloudNet), Year: 2017, pp. 1-5.

R. Valarmathi and T. Sheela, "A comprehensive survey on Task Scheduling for parallel workloads based on Particle Swarm optimisation under Cloud environment," 2017 2nd International Conference on Computing and Communications Technologies (ICCCT), Year: 2017, pp. 81-86.

| 235A | | | |
|---|---|---|---|
| AggregatedRequest | ViewableByOtherDevices | SecurityRestrictions | TimeRestrictions |
| updateView: CustomerViewByName | Yes | N/A | 3 seconds from x time |

| 235C | | | | |
|---|---|---|---|---|
| AggregatedRequest | ViewableByOtherDevices | SecurityRestrictions | TimeRestrictions | AdditionalRequestor |
| updateView: CustomerViewByName | Yes | N/A | 3 seconds from x time | updateView: CustomerViewByName (user 2) |

FIG. 11

DYNAMICALLY OPTIMIZING LOAD IN CLOUD COMPUTING PLATFORM USING REAL-TIME ANALYTICS

BACKGROUND

The present invention relates to computing technology, and particularly a cloud computing system to dynamically optimize computational load in the cloud computing system using real-time analytics.

Cloud computing has become a popular way to offer various Information Technology (IT) concepts as services. In one implementation, a consumer or requestor can request a service they desire and transact with a "cloud" provider for the needed service. A cloud provider's business opportunity can be limited or constrained by the physical resources they have installed, or by their capacity to procure additional resources in a timely and cost-efficient manner. In many cases, if the customer (service requester) has not allowed for ample lead time, then the request likely is not fulfilled by the cloud provider or is not fulfilled in a timely manner.

SUMMARY

According to one or more embodiments of the invention described herein, a computer-implemented method includes adding, by a first device, a first task request to a queue being processed by a data center. The first task request includes metadata indicative of a computing resource to be used by the data center for processing the first task request. The method further includes determining, by a second device, that the computing resource is also associated with a second task request of the second device. The method further includes aggregating, by the second device, the second task request with the first task request in the queue. The method further includes receiving, by the first device, a result in response to the first task request being executed by the data center. The method further includes receiving, by the second device, the result in response to the first task request being executed by the data center.

According to one or more embodiments of the present invention, a system includes a data center that includes multiple servers, a first client device coupled with the data center, and a second client device coupled with the data center. The first client device adds a first task request in a queue of task requests being processed by the data center, and receives a first response upon completion of the first task request by the data center. The second client device determines that the first task request in the queue is associated with a data topic that is common with a second task request. In response, the second client device aggregates the second task request with the first task request in the queue, and receives the first response upon completion of the first task request by the data center.

According to one or more embodiments of the present invention, a computer program product includes a computer readable storage medium having stored thereon program instructions executable by one or more processing devices to perform a method. The method includes adding, by a first device, a first task request to a queue being processed by a data center. The first task request includes metadata indicative of a computing resource to be used by the data center for processing the first task request. The method further includes determining, by a second device, that the computing resource is also associated with a second task request of the second device. The method further includes aggregating, by the second device, the second task request with the first task request in the queue. The method further includes receiving, by the first device, a result in response to the first task request being executed by the data center. The method further includes receiving, by the second device, the result in response to the first task request being executed by the data center.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 11 depicts an example scenario according to one or more embodiments of the present invention.

DETAILED DESCRIPTION

Figure 1:
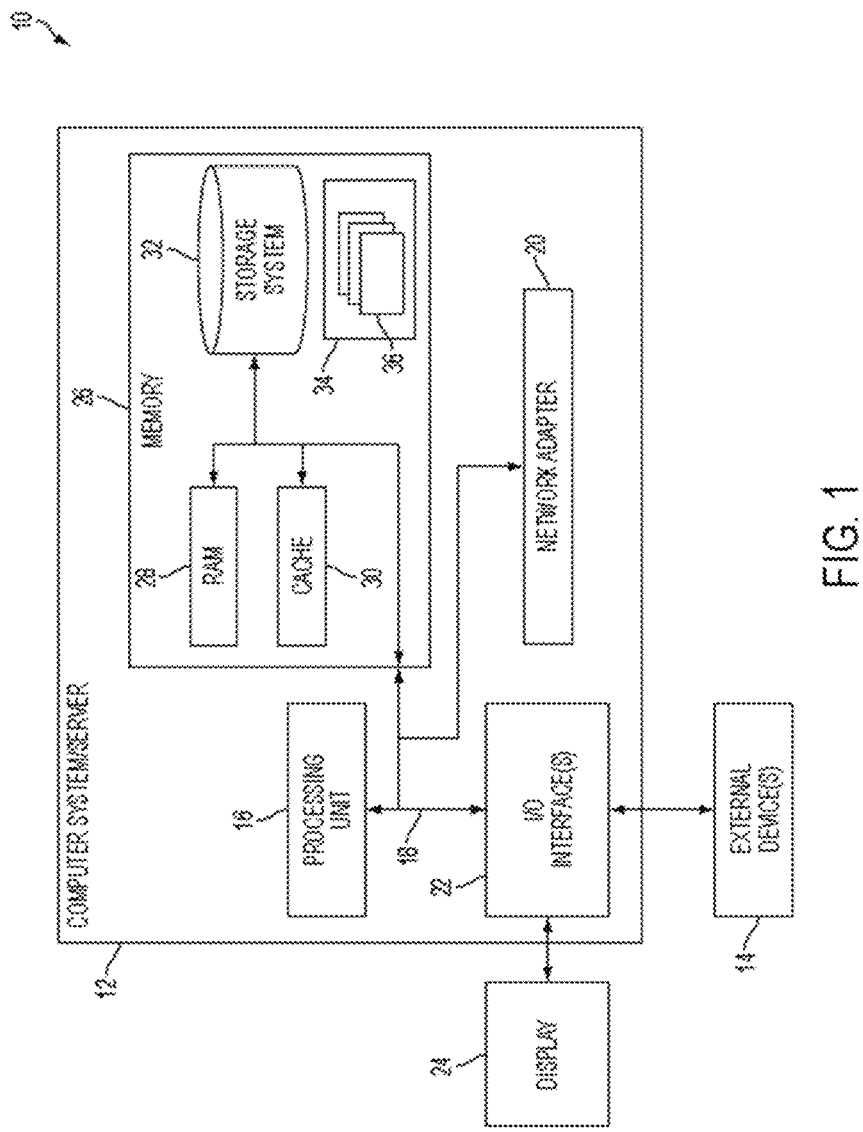
FIG. 1 depicts a cloud computing node according to one or more embodiments of the present invention.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 26, and a bus 18 that couples various system components including system memory 26 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 26 can include computer system readable media in the form of volatile memory, such as random access memory (RAM) 28 and/or cache memory 30. Computer system/server 12 may further include other removable/non-removable, volatile/non-volatile computer system storage media. By way of example only, storage system 32 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 26 may include at least one program product having a set (e.g., at least one) of program modules that are configured to carry out the functions of embodiments of the invention.

Program/utility 34, having a set (at least one) of program modules 36, may be stored in memory 26 by way of example, and not limitation, as well as an operating system, one or more application programs, other program modules, and program data. Each of the operating system, one or more application programs, other program modules, and program data or some combination thereof may include an implementation of a networking environment. Program modules 36 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
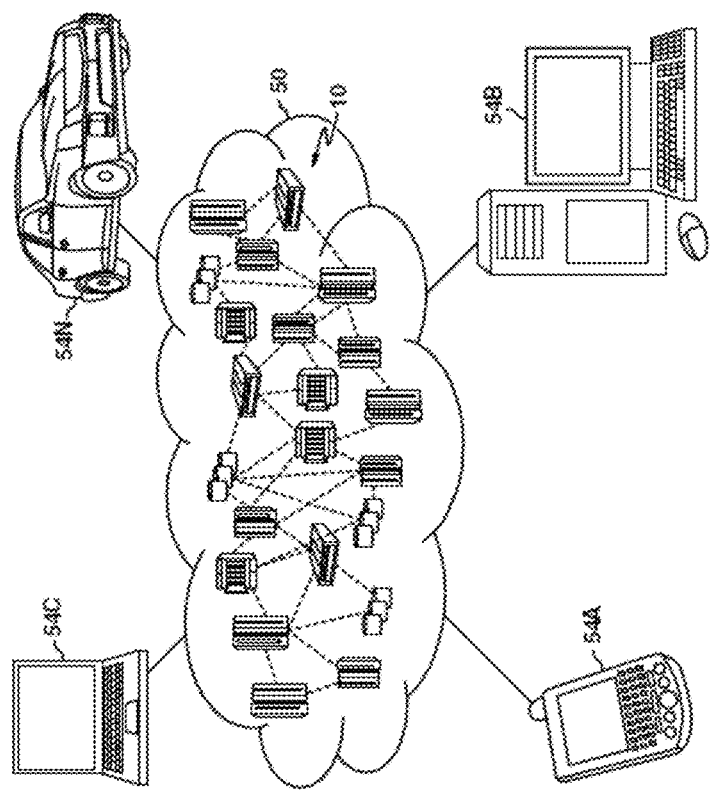
FIG. 2 depicts a cloud computing environment according to one or more embodiments of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
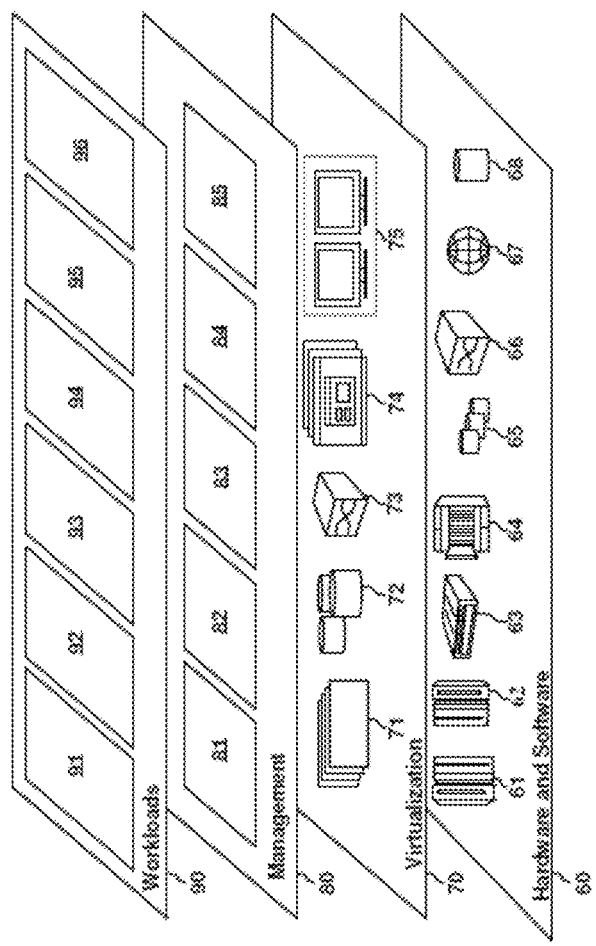
FIG. 3 depicts abstraction model layers according to one or more embodiments of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and social networking and e-commerce 96, and the like.

A data center that provides such a cloud computing environment includes multiple servers. Typically the data center has a workload policy according to the computing resources available at the data center. The workload policy limits (or allows) the data center, at a specific point in time, to handle a specific load. Here, "load" indicates a number of computing resources being utilized to process or complete one or more operations or tasks. For example, the data center may be limited to perform I/O on 34% of the servers and to perform computational analysis, such as Hadoop processing, on 10% of the servers in the data center. The workload policy is determined to provide optimal computing by the data center based on the computing resources in the data center. It is understood that the distribution between IO and analysis can be different in other examples and also that in other examples other types of tasks (e.g. storage) can also be part of the distribution. A technical problem exists that the workloads being processed by the data center may not include the same distribution as that in the workload policy, resulting in a suboptimal performance by the data center.

The one or more embodiments of the present invention address such technical problems by facilitating to harness the imposed constraint by the workload policy. The one or more embodiments of the present invention create a "batch" of tasks to be processed that matches the imposed distribution of task types by the workload policy for optimal performance of the data center, for example, "34% IO tasks and 10% analysis tasks."

The one or more embodiments of the present invention accordingly address the optimization of workload for the data center—tasks from the end user that are processed in the cloud computing platform. The one or more embodiments of the present invention provide dynamic workload optimization which can have at least the two possibilities: determine which data/tasks to reduce/increase from one or more client devices (e.g. promote certain types of tasks from specific users at certain times); and determine which data/tasks are to be batched (bundled together) in the data center to speed up processing.

Figure 4:
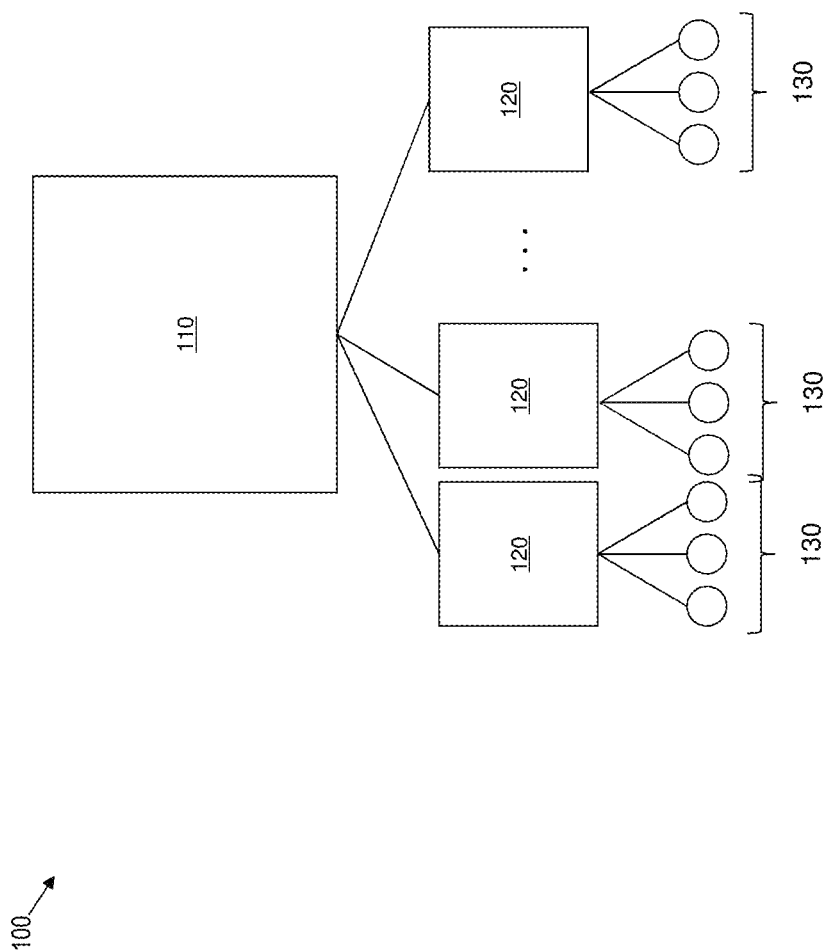
FIG. 4 depicts an example block diagram of a system for dynamically optimizing load in cloud computing platform using real-time analytics according to one or more embodiments of the present invention.

FIG. 4 depicts an example block diagram of a system 100 for dynamically optimizing computational load in a cloud computing system using real-time analytics according to one or more embodiments of the present invention. The system 100 includes one or more client devices 130 communicating with one or more cloud service providers 120. The client devices 130 send one or more task requests and corresponding data to the cloud service providers 120 for execution. The cloud service providers 120, in turn, use the data center 110 to process the task requests and return the results to the client devices.

The client devices 130 can be a phone, a tablet computer, a laptop computer, a desktop computer, or any other computing device that creates and sends the task requests to the cloud service providers. For example, a client device 130 can be used to perform a search query, for example using a search engine like YAHOO™, BING™, GOOGLE™ and the like; or to access a social media website like FACEBOOK™, SNAPCHAT™, LINKEDIN™, and the like; or to exchange messages via an email server or a messaging server such as EXCHANGE SERVER™, WHAT SAPP™, and the like; or to perform any other such computational task. For example, the task requests can include document processing, scientific computations, image processing, data access, or any other such computational task.

The service provider 120 can be a computer server or any other computing device that receives the task requests from the one more client devices 130. For example, the cloud service provider 120 can be a search engine like YAHOO™, BING™ GOOGLE™, and the like; or to access a social media website like FACEBOOK™ SNAPCHAT™, LINKEDIN™, and the like; an email server or a messaging server such as EXCHANGE SERVER™, WHATSAPP™, and the like; or any other such cloud computing service provider. Alternatively, or in addition, the cloud computing service provider 120 can provide services such as document processing, scientific computations, image processing, data access, or any other such computational task. In one or more examples, the service provider 120 forwards the task request that is received from the client device 130 to the data center 110 for execution.

The data center 110 can be a computer server or a server cluster that includes multiple computer servers that use distributed computing to execute the one or more task requests that are forwarded from the cloud service provider 120. Typically, the data center 110 is concurrently executing task requests from more than one cloud service provider 120. It is understood that the volume of task requests being handled by the data center 110 is large, thousands of task requests per minute, and executing the task requests at substantially real-time is not something that is practically possible manually, such as using pen and paper. The one or more embodiments of the present invention are accordingly rooted in computing technology that is required to execute such large volumes of task requests. A technical problem with such a high volume of task requests is having a low (0.1 second, substantially real-time) turn-around time at the client device 130 to receive a response to a task request.

Figure 5:
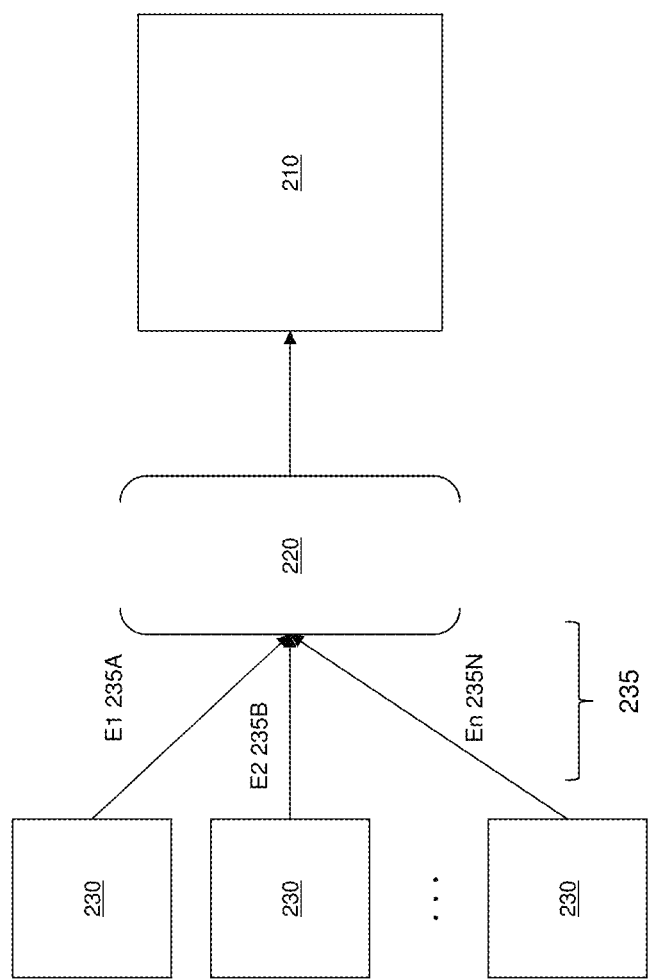
FIG. 5 depicts a flowchart for an example method of dynamically optimizing load in cloud computing platform using real-time analytics according to one or more embodiments of the present invention.

FIG. 5 depicts an example block diagram depicting a typical processing of the task requests by the data center 110. As shown, "producers" 230 add one or more task requests 235 into a queue 220 and a "consumer" 210 reads the task requests 235 from the queue 220 for execution. For example, a first producer 230 adds a first task request E1 235A, a second producer 230 adds a second task request E2 235B, and so on and an nth producer 230 adds an nth task request En 235N into the queue 220. The producers 230 can be the cloud service providers 120 and/or the client devices 130 that creates the task requests 235. The consumer 210, in this case, is the data center 110 that consumes the task requests from the queue 220 by executing the task request.

It should be noted that although a one-one relationship between producers 230 and task requests 235 is shown, in one or more examples, a producer 230 can add more than one task requests 235 into the queue 220. For example, the first producer 230 can add the task requests E1 235A, and E2 235B, into the queue 220.

In one or more examples, the queue 220 is a data structure that is maintained by the consumer 210. The producers 230 may not be aware of the queue 220, and keep sending the task requests to the consumer 210, which in turn, add the task requests into the queue 220. The one or more servers of the consumer 210, such as the data center 110, read the task requests 235 from the queue 220 for processing.

In high volume task request processing systems several task requests 235 in the queue 220 may be related to a particular user session. A user session is a client/server session that is a series of related communications between a particular client device 130 and a cloud service provider 120 that take place over a period of time. With an established user session, the cloud service provider 120 can identify the client device 130 associated with each task request and can remember—over numerous task requests—the specific client device 130. In one or more examples, the user session is associated with one or more unique identifiers of the client device 130, such as an internet protocol (IP) address, a media access control (MAC) address of the client device 130, and the like.

Processing of such task requests individually is inefficient, as each individual processing can include renegotiating (e.g. accessing memory, accessing third party server, parsing, serialization etc.) one or more computer resources in a particular manner for the user session. This is a technical problem that can cause the response time to increase. The one or more embodiments of the present invention address this technical problem by improving the efficiency of executing the task requests 235 in the queue 220 by combining or aggregating the task requests 235.

In one or more examples, the aggregation is performed at the time the task requests are generated and begins at initial workload ingestion to provide performance improvements. The performance improvements are realized because of at least a reduced number of parses, a reduced number of serializations, a reduced number of commits (reduced I/O), an increased processing efficiency, and the like.

If aggregation of the task requests 235 is performed at the source, i.e. at producers 230, under certain conditions, the aggregation can occur sub-optimally causing a decrease in processing performance, efficiency, and scalability. The following factors can influence the aggregation: Messaging rates—lower rates typically reduce a viability of aggregation during workload ingestion; Latency settings—lower requirements typically reduce the viability of aggregation during workload ingestion; Scale of deployments (number of threads)—if more threads are reading the task requests in the queue 220, the queue 220 can be depleted leading to suboptimal aggregation during workload ingestion.

It is also possible for optimal aggregation to become fragmented as separate task requests that are aggregated take different processing paths resulting in non-aggregated follow-on events leading to a fragmented workload. The one or more embodiments of the present invention address such technical challenges with aggregating the task requests 235 in the queue 220.

For example, referring to FIG. 5, if the two separate task requests E1 235A and E2 235B that are written to the queue 220 each relate to singular and separate transactions, then each one is consumed separately and processed in isolation.

In another example, consider that the producers 230 of the task requests 235 establish that one or more events (e.g. based on data type, size, time proximity) can be aggregated with another task request that is already in the queue 220 (and in the current scope). For example, consider that the multiple task requests E1 235A and 235B are aggregated into a task request E' 235C.

Consider that the task requests 235A and 235B are bundled together for processing if the task requests 235A and 235B have a similar data type. In one or more examples, one or more analytics engines executing on the consumer 210 are optimized to handle a certain data type associated with the task requests 235A and 235B, and accordingly, the aggregation of the task requests 235A and 235B improves execution time. In one or more examples, the aggregation/bundling is performed by detecting the similar data type of the task requests 235A and 235B using an annotation for task requests 235A and 235B, the annotation indicating the data type.

Figure 6:
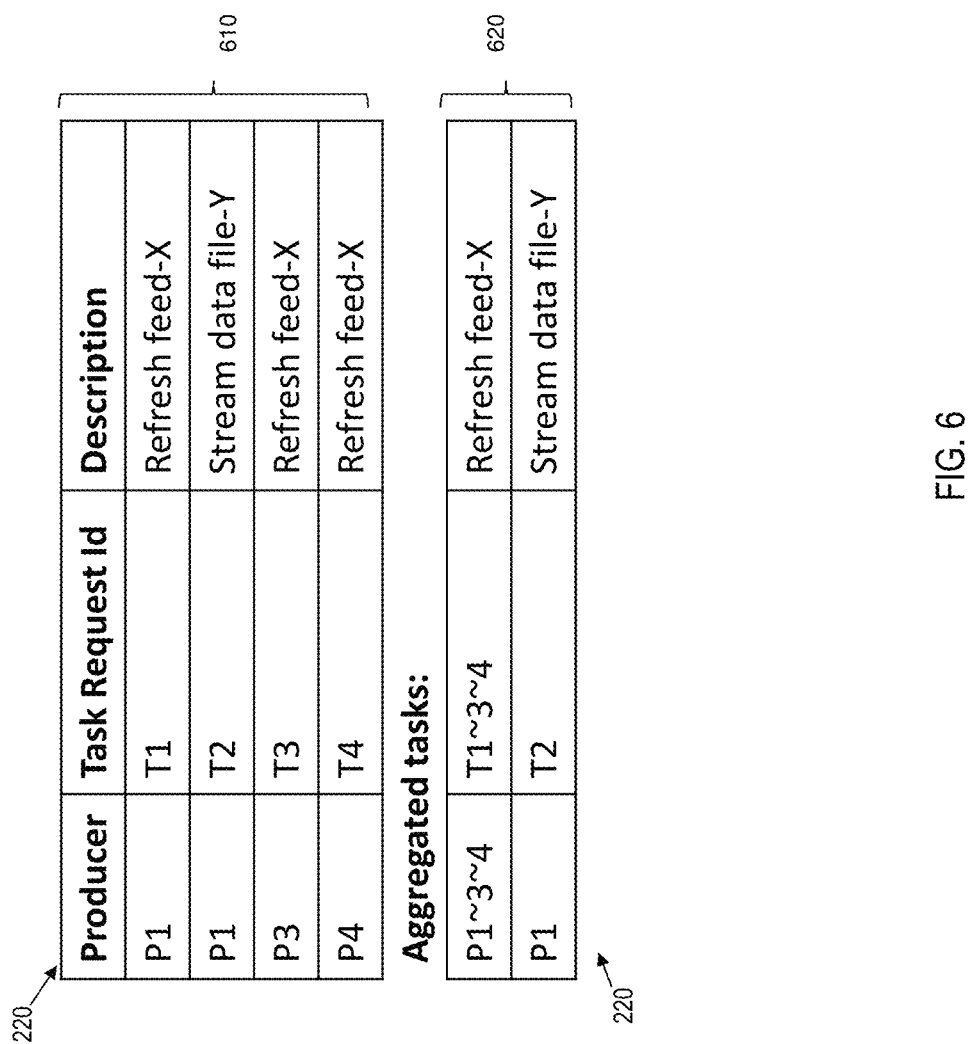
FIG. 6 depicts an example aggregation of task requests according to one or more embodiments of the present invention.

FIG. 6 depicts an example aggregation of task requests according to one or more embodiments of the present invention. Two views of the queue 220 are depicted in FIG. 6—a first view 610 of the queue 220 includes entries for the task requests 235 (T1, T2, T3, and T4) from producers 230 (P1, P3, and P4); and a second view 620 of the queue 220 that depicts the task requests 235 after aggregation. The tasks T1, T3, and T4 are all associated with the same data type 'feed-X', for example a social media feed, a news feed, or any other such data type. The task T2 is associated with a separate data type—'file-Y', such as a document, an audio, a video, an image, or any other electronic data. As per the example scenario described earlier, the task requests T1, T3, and T4, which are associated with the same data type (feed-X) are aggregated into a single task request, and the task request T2 is kept separate in the queue 220 (see second view 620).

The "aggregation" of task requests 235 as described in this document is meant to denote the combining of the task requests 235 into one, single task request (235C), not just the collecting of task requests together, such that the data center 110 only has to execute the single combined task request 235C instead of the individual task requests 235. The aggregation, accordingly, facilitates resource optimization at the data center 110 (consumer 210).

According to one or more embodiments of the present invention the client devices 130 (which might be being used by separate users, UserA, UserD, and UserT) can recognize and retrieve multiple and non-adjacent task requests 235 with workload affinity patterns that are likely to produce similar benefits to those where aggregation is achieved at the data center 110. One or more embodiments of the present invention facilitate the consumer 210 to, while processing a task request, to locate additional task requests that can be aggregated and processed together such that processing efficiencies are achieved.

Figure 7:
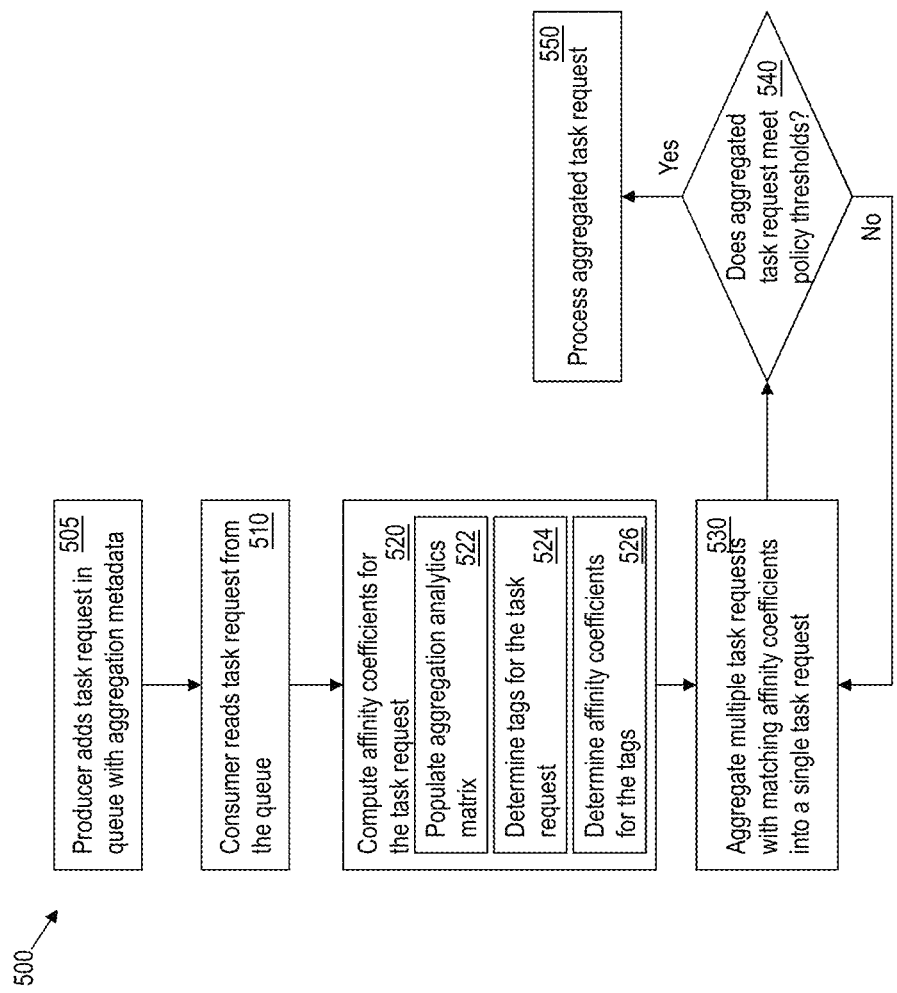
FIG. 7 depicts a flowchart for an example method of dynamically optimizing computational load in a cloud computing system using real-time analytics according to one or more embodiments of the present invention.

FIG. 7 depicts a flowchart for an example method 500 of dynamically optimizing computational load in a cloud computing system using real-time analytics according to one or more embodiments of the present invention. The method includes the producer 230 adding the task request 235A in the queue 220 with aggregation metadata, at 505. Each entry in the queue 220 includes a unique task identifier, a unique producer identifier, the computer executable instructions and data associated with the task request 235A. Further, the queue 220 includes aggregation metadata that is provided by the producer 230. The aggregation metadata includes one or more factors that are used for aggregating the task request 235A with other task requests 235. For example, the aggregation metadata includes, but is not limited to a data type, a size, a temporal proximity, a geographic proximity, and/or other such factors or a combination thereof.

The method 500 further includes the consumer 210 reading the task request 235A added in the queue 220, at 510. The consumer 210 further computes a set of affinity coefficients for the task request 235A, at 520. An affinity coefficient is a computed score to indicate a similarity between the task request 235A and one or more topics associated with other task requests 235 in the queue 220. The affinity score is used to determine which task requests 235 in the queue can be aggregated into a single task request. In one or more examples, the affinity coefficient is computed using an aggregation analytics matrix that is populated with the aggregation metadata associated with the one or more task requests 235 in the queue 220, at 522.

Figure 8:
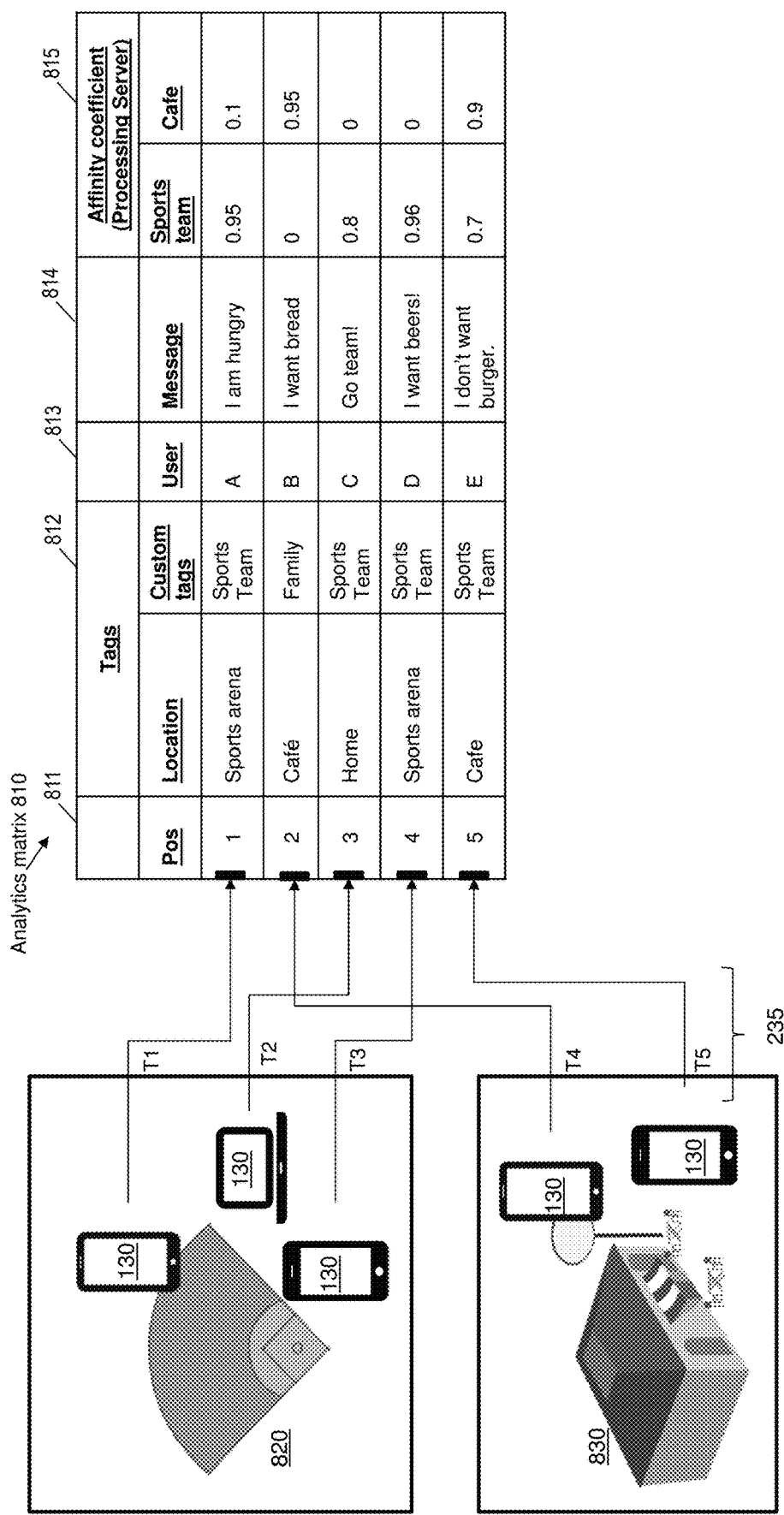
FIG. 8 depicts an example aggregation analysis matrix according to one or more embodiments of the present invention.

FIG. 8 depicts an example aggregation analysis matrix 810 according to one or more embodiments of the present invention. Here, consider the example scenario that multiple client devices 130 located at a baseball game field 820 and at a cafe 830 add task requests 235 (T1-T5) to the queue 220. It is understood that the number of client devices 130 and the number of task requests 235 depicted are exemplary and that a different number of client devices 130 and task requests 235 are possible in different examples. Further, the locations themselves, as well as the number of locations used in this example scenario, are variable in different examples.

Here, the task requests 235 are messages 814 sent by the client devices 130. In other examples, the task requests 235 can include different types of task requests described herein. The task requests 235 when added to queue 220, corresponding entries are added in the aggregation analysis matrix 810. An entry in the aggregation analysis matrix 810 includes one or more tags 812, and a user identifier 813 for the user that initiated the corresponding task request 235. The entry further includes any data associated with the task request 235, such as the message text 814.

The tags 812 can include different types of metadata associated with the task request 235. For example, the tags 812 can include a location identifier indicating a location of the client device 130 when the task request 235 is added into the queue 220. The tags 812 can further include a time at which the task request 235 is added. Further, the tags 812 can include custom tags added by the user when creating the task request 235. For example, the custom tags can include an association that the user provides to link the task request with a location, or with a particular tag. For example, in FIG. 8, for the task requests T1, T2, T3, and T4, the users have added a sports team identifier as a custom tag, for example, during an ongoing game of the sports team. It should be noted that the users can add any other custom tags than the examples illustrated herein.

The aggregation analysis matrix 810 further includes a set of affinity coefficients 815 for each task request 235. The set of affinity coefficients 815 includes an affinity coefficient of the task request 235 to each of the tags 812. For example, in the ongoing example of FIG. 8, there are two affinity coefficients 815 for the two tags 812 respectively—sports team, and cafe. Here, each tag from the tags 812 serves as a topic/context for analyzing the task request 235.

Referring to the flowchart of FIG. 7, the affinity coefficient computation (520) further includes determining the tags 812 from the aggregation analysis matrix 810, at 524. As described, the tags 812 of the task request 235A can be automatically populated based on the metadata of the task request 235A, such as location identifier, timestamp of creation, data type in the task request, user identifier, client device identifier, and the like. Further, the tags 812 can be provided by the user who initiated the task request 235A.

The affinity coefficient computation further includes determining the affinity coefficients 815 for the tags 812 of the task request 235A, at 526. In one or more examples, a statistical analysis is used to determine the affinity among two or more task requests. For example, an affinity for a particular mix or ratio of task requests can be computed using chi-square ($\chi^2$) test, which measures an alignment between two sets of frequency measures. Accordingly, the producer 230 calculates and publishes with the task request 235A, metadata that describes the one or more affinity coefficients for the task request 235A.

Further, the method 500 includes creating a single task request by aggregating multiple task requests 235 from the queue with matching affinity coefficients, at 530. Determining which task requests 235 to aggregate can use different criteria. In one or more examples, the criteria for selecting the task requests 235 to aggregate is an exact match. In this case, for the task request 235A being added into the queue 220, additional task requests 235 in the queue 220 with matching aggregation coefficient(s) are identified. The matching can be performed within a predetermined tolerance, such as ±0.5, ±1, or any other such tolerance value. This technique can be used in cases where separate independent producers 230 are producing the task requests 235 in isolation, without the benefit of being able to aggregate at the production stage itself.

In one or more examples, determining the matching aggregation coefficients includes retrieving additional task requests 235A from the queue 220 for which subsequently generated task requests aggregate more optimally. In this case coefficient relationships between task requests 235 in the queue 220 are stored and the relationships are subsequently analyzed. For example, a first pattern in the relationships is analyzed to identify likely outcomes of a task request and looks for other task requests that are most likely to yield substantially the same outcomes. For example, using historical efficiency data of a data center (e.g. processor usage. memory usage, power consumption etc.) it can be determined whether a particular mix or ratio of task requests provides optimal performance during execution. For example, a first set of task requests being executed together is determined to be optimal compared to a second set of task requests because execution of the first set is at least at a particular threshold of efficiency more (such as 65% 75%, 90% etc.) than the second set. Alternatively, or in addition, a second pattern can be identified that looks for other task requests that are likely to produce additional task requests that will aggregate with the current task request 235A, and that can be retrieved and processed before the current task request 235A. The analysis of the coefficient relationship information determines which relationships can produce the optimal aggregation results.

The method 500 further includes determining if the aggregated task request 235C meets policy thresholds of the data center 110, at 540. If so, the aggregated task request 235C is executed by the data center 110, at 550. If not, the aggregation continues to add additional task requests from the queue 220 in the aggregated task request 235C, as described herein.

Figure 9:
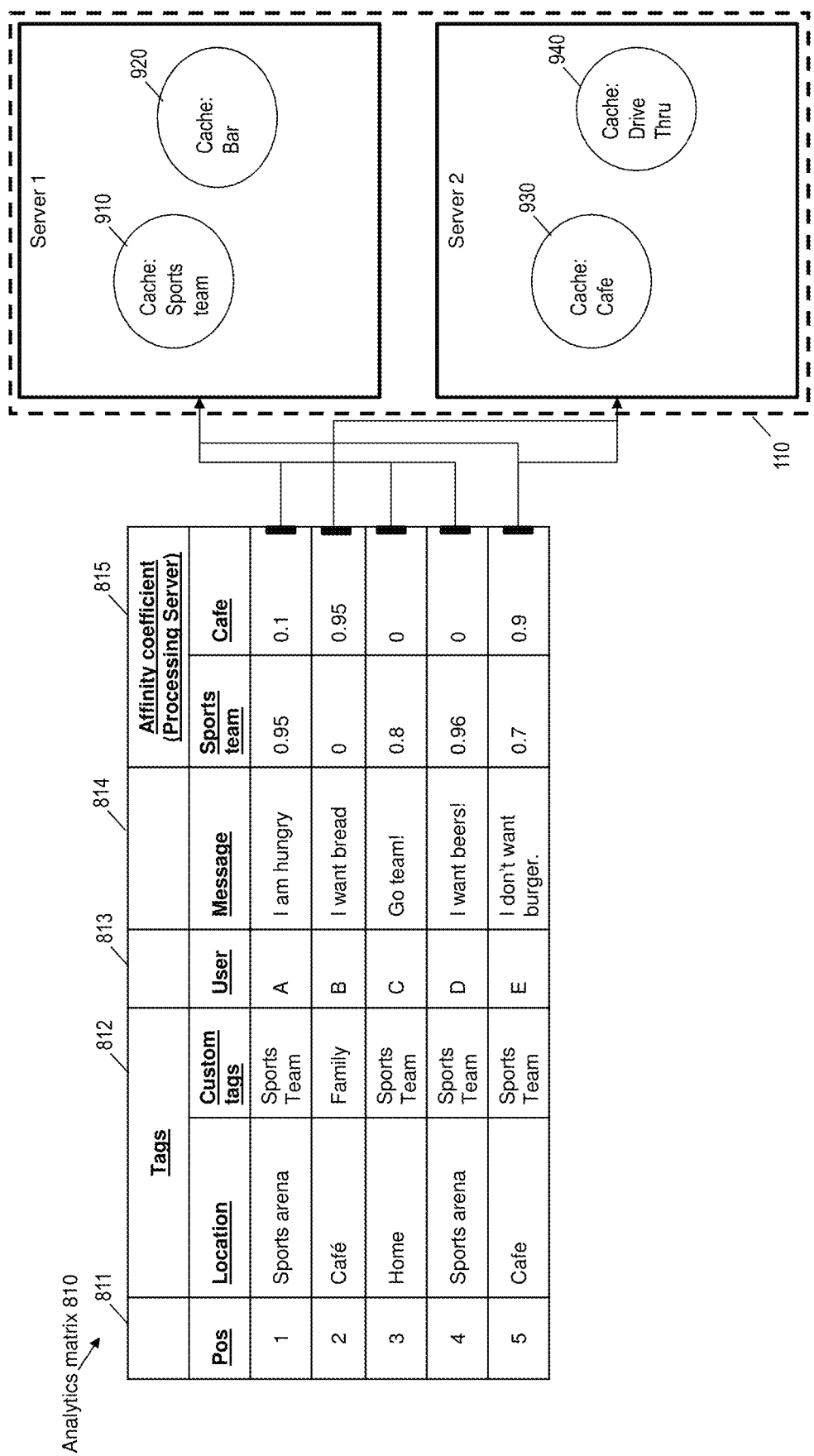
FIG. 9 depicts the processing of the aggregated tasks in the example scenario described in FIG. 8 according to one or more embodiments of the present invention.

FIG. 9 depicts the processing of the aggregated tasks in the example scenario described in FIG. 8 according to one or more embodiments of the present invention. The aggregation analysis matrix 810 is used to determine which server from the data center 110 executes the aggregated task request 235C. Alternatively, or in addition, the aggregation analysis matrix 810 is used to determine which server from the data center 110 executes any of the one or more task requests 235 in the queue 220.

For example, in FIG. 9, a first server 901 in the data center 110 has cached information about the topic "sports team" in a first cache memory space 910, and about a topic "bar" in a second cache memory space 920. In addition, one or more computing resources in the server 901 are configured to perform one or more operations with the cached information. Similarly, a second server 902 has cached information about the topic "cafe" in a first cache memory space 930, and about a topic "drive-thru" in a second cache memory space 940. Each of the topics is represented by a tag in the set of tags 812 in the aggregation analysis matrix 810.

Depending on the affinity coefficient values 815 for the tags 812, the task request is assigned to a particular server that has already operated on a similar task request. For example, as depicted in FIG. 9, task requests that have higher affinity coefficient value 815 for the topic "sports team" are assigned to the server 901 that has the topic cached in the first cache memory space 910. The task requests that have higher affinity coefficient value 815 for the topic "cafe" are assigned to the second server 902 that has the topic cached in the first cache memory space 930.

Figure 10:
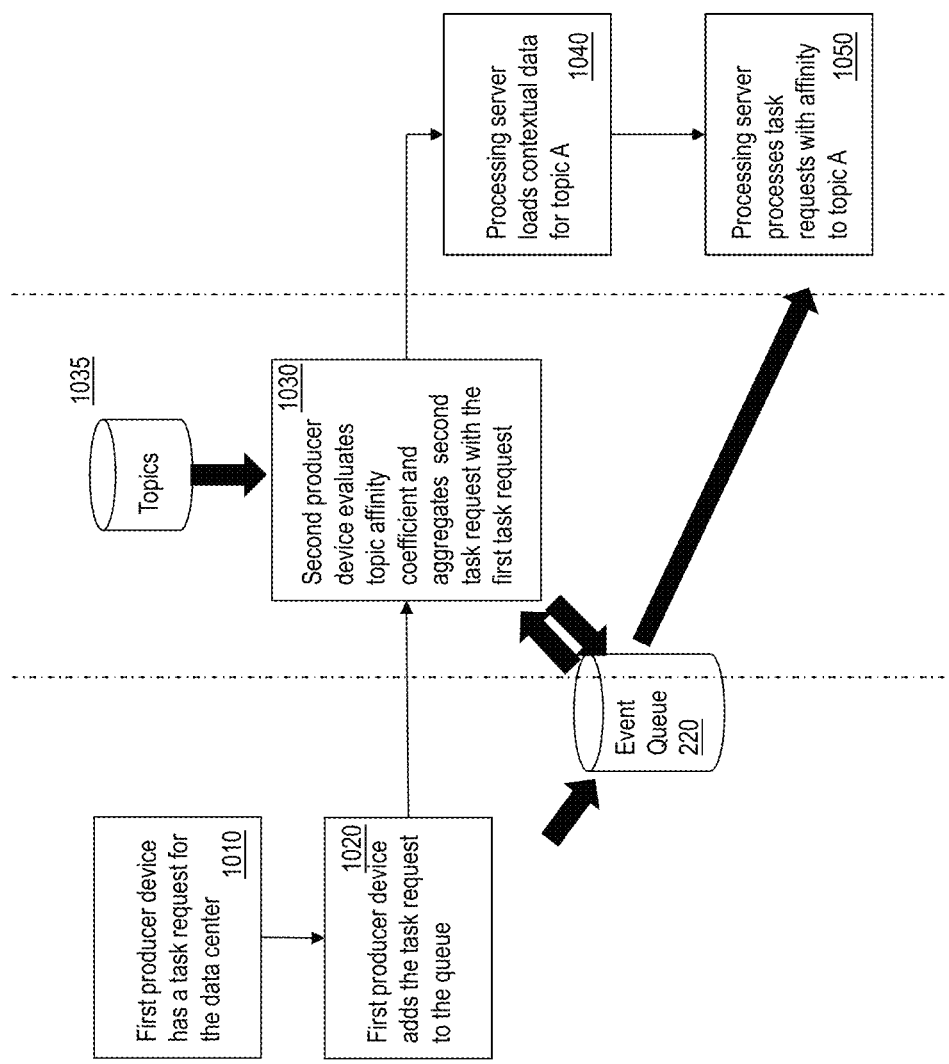
FIG. 10 is a dataflow/sequence diagram for the execution of the method for dynamically optimizing computational load in a cloud computing system using real-time analytics according to one or more embodiments of the present invention.

FIG. 10 is a dataflow/sequence diagram for the execution of the method for dynamically optimizing computational load in a cloud computing system using real-time analytics according to one or more embodiments of the present invention. The operations depicted in FIG. 10 correspond to one or more operations depicted in the flowchart of FIG. 7 and one or more components depicted in other figures herein. The method 700 is implemented by the one or more components of the system 100 operating cooperatively. A first producer device 230, which can be a client device 130 and/or a cloud service provider 120 creates or receives a first task request 235A that is to be executed by the data center 110, at 1010.

In one or more examples, the producers maintain the queue 220 and aggregate the task requests 235 in the queue 220 based on the affinity coefficients. The first producer device 230 that is handling the first task request 235A adds the first task request 235A into the queue 220, at 1020.

A second producer device 230 accesses the first task request 235A from the queue 220 and evaluates the affinity coefficients of the first task request 235A with respect to the one or more topics, at 1030. In one or more examples, the second producer device 230 computes affinity coefficients of the task request 235A with respect to topics of a second task request 235B that the second producer device 230 creates. Alternatively, or in addition, a set of topics 1035 is accessed from a storage device, memory, database, or the like, for computing the affinity coefficients 815. The set of topics 1035 is populated based on the tags 812 of the task requests 235 that are added into the queue 220. The topics 1035 are updated based on the one or more tags 812 associated with the first task request 235A.

If the second producer device 230 determines that the affinity coefficient of a tag from the first task request 235A is higher than a predetermined threshold, that is the first task request uses a common data topic as the second task request 235B, the second producer device 230 aggregates the second task request 235B with the first task request 235A in the queue 220. Accordingly, both the first producer device 230 and the second producer device 230 do not require the data center 110 to load information and computing resources associated with the common data topic separately. The data center 110, in turn, can execute the aggregated task request 235C and send a response to both the producer devices 230.

In one or more examples, the second producer device 230 has a limited duration since the first task request 235A is added into the queue 220 to determine whether the second task request 235B can/should be aggregated with the first task request 235A. FIG. 11 depicts an example scenario according to one or more embodiments of the present invention. The first task request 235A is added into the queue 220 by the first producer device 230. The first task request 235A includes a time restriction, for example, for 3 seconds. It is understood that the time restriction can have any other value in other examples. The time restriction provides that once the first task request 235A is added into the queue 220, the second producer device 230 has that limited duration to view and access the first task request 235A. In this limited duration, the second producer device 230 has to determine whether to aggregate the second task request 235B with the first task request 235A.

In one or more examples, the aggregation includes creating a new single aggregated task request 235C and deleting the first task request 235A from the queue 220. Alternatively, the first task request 235A is used as the aggregated task request.

In either case, the aggregated task request 235C includes an additional entry that indicates an identifier of the second producer device 230 so that a result of executing the aggregated task request 235C can be directed to both, the first producer device 230 and the second producer device 230. It is understood that the aggregated task request 235C can include an aggregation from an additional number of producer devices 230.

In one or more examples, instead of the second producer device 230, the server 901 (or any other server) of the data center 110 accesses the added task request 235A from the queue 220 and evaluates the affinity coefficients of the task request with respect to the one or more topics, at 1030. In one or more examples, the server 901 computes affinity coefficients of the task request 235A with respect to topics of other task requests 235 that are existing in the queue 220. Alternatively, or in addition, a set of topics 1035 is accessed from a storage device, memory, database, or the like, for computing the affinity coefficients 815. The set of topics 1035 is populated based on the tags 812 of the task requests 235 that are added into the queue 220. The topics 1035 are updated based on the one or more tags 812 associated with the task request 235A.

Regardless of which component of the system performs the aggregated task request 235C, once it is created, the server 901 loads contextual data for topic A (e.g. sports team), where the tag corresponding to the topic A has the highest affinity coefficient for the task request 235C, at 1040.

Alternatively, or in addition, the server 901 loads contextual data for topic A based on the tag for the topic A being present in the highest number of task requests 235 in the queue 220. Further, from the task requests 235 in the queue, those that have the topic A tag are aggregated and executed by the processing server 901, at 1050.

Accordingly, one or more embodiments of the present invention facilitate analyzing "Big Data" more efficiently, by understanding contextual affinity of one or more task requests to topics and processing the task requests according to this contextual affinity. By doing that, the amount of contextual data reload (from disk to memory or cache) is minimalized, in turn improving the operation of the data center. The The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   adding, by a first device, a first task request to a queue being processed by a data center, the first task request including metadata indicative of a computing resource to be used by the data center for processing the first task request;
   determining, by a second device, that the computing resource is also associated with a second task request of the second device;
   in response, aggregating, by the second device, the second task request with the first task request in the queue;
   receiving, by the first device, a result in response to the first task request being executed by the data center; and
   receiving, by the second device, the result in response to the first task request being executed by the data center.

2. The computer-implemented method of claim 1, wherein the second device is given a predetermined duration since adding the first task request to the queue to determine that that the computing resource is also associated with the second task request.

3. The computer-implemented method of claim 1, wherein the second device determines that that the computing resource used for the first task request is also associated with the second task request based on a tag associated with the first task request.

4. The computer-implemented method of claim 3, wherein the tag is indicative of at least one from a group of data type, location, and time, associated with the first task request.

5. The computer-implemented method of claim 3, wherein the tag comprises a plurality of tags associated with the first task request, and the second device computes an affinity coefficient for each tag from the plurality of tags, the affinity coefficient indicative of the second task request being associated with the computing resource.

6. The computer-implemented method of claim 1, wherein the computing resource includes data associated with a particular topic.

7. The computer-implemented method of claim 6, wherein the second device determines that the data associated with the particular topic is used for the first task request is also used with the second task request based on a tag associated with the first task request.

8. The computer-implemented method of claim 1, wherein the first device is a client device.

9. The computer-implemented method of claim 1, wherein the first device is a cloud service provider device.

10. A system comprising:
    a data center comprising a plurality of computer servers;
    a first client device coupled with the data center, the first client device comprising a memory device and one or more processors coupled with the memory device, the one or more processors are configured to:
      add a first task request in a queue of task requests being processed by the data center; and
      receive a first response upon completion of the first task request by the data center; and
    a second client device coupled with the data center, the second client device configured to:
      determine that the first task request in the queue is associated with a data topic that is common with a second task request;
      in response, aggregate the second task request with the first task request in the queue; and
      receive the first response upon completion of the first task request by the data center.

11. The system of claim 10, wherein the second client device is given a predetermined duration since adding the first task request to the queue to determine that that the second task request is also associated with the data topic of the first task request.

12. The system of claim 10, wherein the second client device determines that that the data topic of the first task request is also associated with the second task request based on a tag associated with the first task request.

13. The system of claim 12, wherein the tag comprises a plurality of tags associated with the first task request, and the second device computes an affinity coefficient for each tag from the plurality of tags, the affinity coefficient indicative of the second task request being associated with the data topic.

14. The system of claim 10, wherein the first client device receives the first task request from a first user and the second client device receives the second task request from a second user.

15. A computer program product comprising a memory device having stored thereon program instructions executable by one or more processing devices to perform a method comprising:
    adding, by a first client device, a first task request to a queue being processed by a data center, the first task request including metadata indicative of a data topic to be used by the data center for processing the first task request;
    determining, by a second client device, that the data topic is also associated with a second task request of the second client device;
    in response, aggregating, by the second client device, the second task request with the first task request in the queue;
    receiving, by the first client device, a result in response to the first task request being executed by the data center; and
    receiving, by the second client device, the result in response to the first task request being executed by the data center.

16. The computer program product of claim 15, wherein the second client device is given a predetermined duration since adding the first task request to the queue to determine that that the second task request is also associated with the data topic of the first task request.

17. The computer program product of claim 15, wherein the second client device determines that that the data topic of the first task request is also associated with the second task request based on a tag associated with the first task request.

18. The computer program product of claim 17, wherein the tag comprises a plurality of tags associated with the first task request, and the second device computes an affinity coefficient for each tag from the plurality of tags, the affinity coefficient indicative of the second task request being associated with the data topic.

19. The computer program product of claim 17, wherein the tag is indicative of at least one from a group comprising: data type, location, and time, associated with the first task request.

20. The computer program product of claim 15, wherein the first client device receives the first task request from a first user and the second client device receives the second task request from a second user.

\* \* \* \* \*